United States Patent
Valente et al.

(10) Patent No.: US 9,028,358 B2
(45) Date of Patent: May 12, 2015

(54) DISCONNECTING AXLE ASSEMBLY

(71) Applicants: Paul J. Valente, Berkley, MI (US); James P. Downs, South Lyon, MI (US)

(72) Inventors: Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/447,775

(22) Filed: Jul. 31, 2014

(65) Prior Publication Data

US 2014/0342866 A1  Nov. 20, 2014

Related U.S. Application Data

(63) Continuation-in-part of application No. 14/205,535, filed on Mar. 12, 2014.

(60) Provisional application No. 61/787,547, filed on Mar. 15, 2013.

(51) Int. Cl.
| | |
|---|---|
| *F16H 48/06* | (2006.01) |
| *F16H 48/22* | (2006.01) |
| *F16H 48/08* | (2006.01) |

(52) U.S. Cl.
CPC ............... *F16H 48/22* (2013.01); *F16H 48/08* (2013.01); *F16H 2048/082* (2013.01); *F16H 2048/087* (2013.01)

(58) Field of Classification Search
CPC ... F16H 48/22; F16H 48/08; F16H 2048/082; F16H 2048/087
USPC ................................................ 74/606 R, 607
See application file for complete search history.

(56) References Cited

U.S. PATENT DOCUMENTS

| | | | |
|---|---|---|---|
| 696,704 | A | 4/1902 | Allen |
| 1,987,716 | A | 1/1935 | Skelton |
| 3,344,687 | A | 10/1967 | Stockton |
| 4,182,201 | A | 1/1980 | Mayhew et al. |
| 5,098,355 | A | 3/1992 | Long |
| 6,056,663 | A | 5/2000 | Fett |
| 6,540,634 | B2 | 4/2003 | Thompson |
| 6,616,565 | B1 | 9/2003 | Chen et al. |
| 6,623,396 | B2 | 9/2003 | Szalony et al. |
| 6,645,113 | B2 | 11/2003 | Orr et al. |
| 6,652,408 | B2 | 11/2003 | Rutt et al. |
| 6,695,739 | B2 | 2/2004 | Fett |
| 6,699,154 | B2 | 3/2004 | Orr et al. |

(Continued)

FOREIGN PATENT DOCUMENTS

| | | |
|---|---|---|
| EP | 1348589 A2 | 10/2003 |
| JP | 2001010304 A | 1/2001 |
| WO | WO-2010123964 A1 | 10/2010 |

*Primary Examiner* — David J Hlavka

(74) *Attorney, Agent, or Firm* — Harness, Dickey & Pierce, P.L.C.

(57) ABSTRACT

An axle assembly having an axle housing assembly having a carrier housing and first and second end caps that are mounted to the carrier housing. The first end cap cooperates with the carrier housing to define a differential cavity for receipt of a differential assembly, while the second end cap cooperates with the carrier housing to define a clutch cavity for receipt of a clutch. A spindle drivingly couples a first output of the differential with an input of the clutch member. A first output member is coupled for rotation with a second output of the differential and a second output member is coupled for rotation with an output of the clutch. The spindle is received through a tubular portion of carrier housing.

20 Claims, 3 Drawing Sheets

(56) References Cited

U.S. PATENT DOCUMENTS

| | | |
|---|---|---|
| 6,702,707 B2 | 3/2004 | Krzesicki et al. |
| 7,022,041 B2 | 4/2006 | Valente |
| 7,188,699 B2 | 3/2007 | Moore et al. |
| 7,232,399 B2 | 6/2007 | Valente |
| 7,393,301 B2 | 7/2008 | Green, Jr. |
| 7,520,833 B2 * | 4/2009 | Honda et al. .................. 475/248 |
| 7,775,928 B2 | 8/2010 | Zink |
| 7,901,318 B2 | 3/2011 | Downs et al. |
| 7,984,782 B2 | 7/2011 | Platt et al. |
| 8,167,758 B2 | 5/2012 | Downs et al. |
| 8,951,159 B2 * | 2/2015 | Fox et al. ...................... 475/231 |
| 2003/0070501 A1 | 4/2003 | Bell |
| 2009/0163313 A1 * | 6/2009 | Gassmann et al. ............ 475/150 |
| 2013/0303323 A1 * | 11/2013 | Zink et al. ..................... 475/160 |

\* cited by examiner

DISCONNECTING AXLE ASSEMBLY

CROSS-REFERENCE TO RELATED APPLICATIONS

This application is a continuation-in-part of U.S. patent application Ser. No. 14/205,535 filed on Mar. 12, 2014, which claims the benefit and priority of U.S. Provisional Patent Application No. 61/787,547 filed Mar. 15, 2013. The entire disclosure of each of the above applications is incorporated herein by reference.

FIELD

The present disclosure relates to a disconnecting axle assembly.

BACKGROUND

This section provides background information related to the present disclosure which is not necessarily prior art.

Disconnecting automotive axle assemblies typically include a differential mechanism having a differential case, which is supported by a pair of differential bearings for rotation within an axle housing, and a clutch that is configured to selectively interrupt the transmission of rotary power through the axle assembly. The differential bearings are typically mounted on trunnions formed on the differential case. The axle shafts of these axle assemblies have an inboard end that is typically engaged to an output member of the differential mechanism and supported indirectly by the differential case. While this type of arrangement is suited for its intended purpose, there remains a need in the art for an improved disconnecting axle assembly.

SUMMARY

This section provides a general summary of the disclosure, and is not a comprehensive disclosure of its full scope or all of its features.

In one form, the present teachings provide an axle assembly having an axle housing assembly, an input pinion, a ring gear, a differential assembly, a clutch, a spindle, and first and second output members. The axle housing assembly has a carrier housing and first and second end caps that are mounted to the carrier housing. The first end cap cooperates with the carrier housing to define a differential cavity, while the second end cap cooperates with the carrier housing to define a clutch cavity. The input pinion extends into the differential cavity. The ring gear is disposed in the differential cavity and is meshingly engaged with the input pinion. The ring gear is supported for rotation about a second axis by a four-point angular contact bearing. The differential assembly is received in the differential cavity and is configured to receive rotary power from the ring gear. The differential assembly has a first differential output and a second differential output. The clutch has a first clutch member and a second clutch member. The clutch is configured to selectively transmit rotary power between the first and second clutch members. The clutch is received in the clutch cavity. The spindle drivingly couples the first differential output with the first clutch member. The first output member is coupled for rotation with the first differential output. The second output member is coupled for rotation with the second clutch member. The spindle is received through a tubular portion of carrier housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
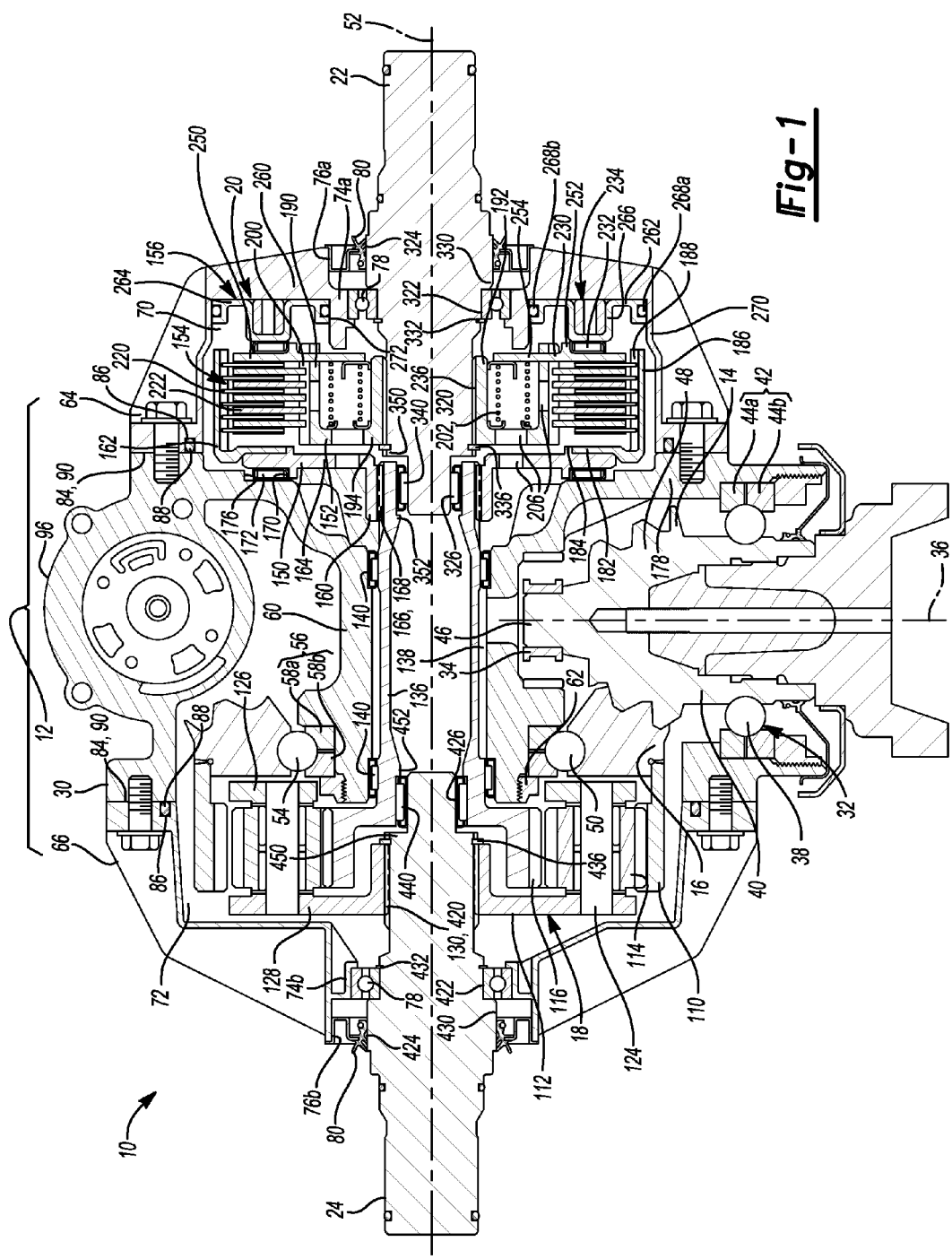
FIG. 1 is a longitudinal section view of an exemplary disconnecting axle assembly constructed in accordance with the teachings of the present disclosure.
Figure 2:
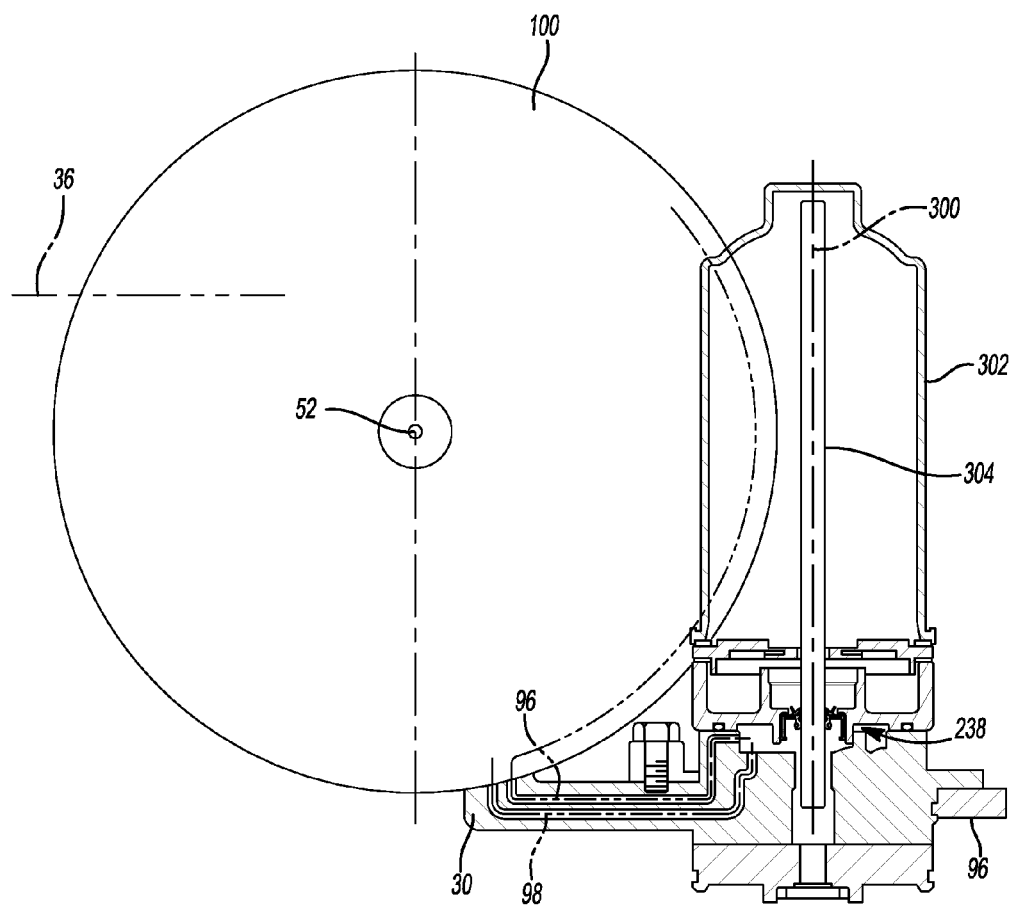
FIG. 2 is a side elevation view of the axle assembly of FIG. 1.

With reference to FIGS. 1 and 2 of the drawings, an exemplary axle assembly constructed in accordance with the teachings of the present disclosure is generally indicated by reference numeral 10. The axle assembly 10 can include an axle housing assembly 12, an input pinion 14, a ring gear 16, a differential assembly 18, a clutch 20 and first and second output members 22 and 24, respectively.

Generally, and except as described herein, the input pinion 14, the ring gear 16, and associated portions of the axle housing assembly 12 can be configured as is described in co-pending U.S. patent application Ser. Nos. 14/205,535 and 14/294,221, the disclosures of which are incorporated by reference as if fully set forth in detail herein. Briefly, the axle housing assembly 12 can include a carrier housing 30. The input pinion 14 can be mounted on a tail bearing 32 and a head bearing 34 that can solely support the input pinion 14 for rotation relative to the carrier housing 30 about a first axis 36. The tail bearing 32 can be a four-point angular contact bearing having an inner bearing race 38 that is unitarily and integrally formed into a shaft portion 40 of the input pinion 14. The outer race 42 of the tail bearing 32 can be defined by a pair of race members 44a and 44b that can be spaced apart from one another along the first axis 36. The head bearing 34 can be a type of roller bearing, such as a needle bearing, that can be mounted to a cylindrical projection 46 that is formed on the input pinion 14. The head bearing 34 can be spaced apart from the tail bearing 32 so that a pinion gear 48 of the input pinion 14 is disposed between the tail and head bearings 32 and 34. The ring gear 16 can be mounted on a four-point angular contact bearing 50 that can support the ring gear 16 for rotation relative to the carrier housing 30 about a second axis 52. The four-point angular contact bearing 50 can have an outer bearing race 54, which can be unitarily and integrally formed in the ring gear 16, and an inner bearing race 56 that can be defined by first and second race members 58a and 58b. The first and second race members 58a and 58b can be spaced apart along the second axis 52.

In contrast to the axle housing assemblies that are described in the aforementioned patent applications, the four-point angular contact bearing 50 that supports the ring gear 16 can be mounted on a generally tubular portion 60 on the carrier housing 30, a nut 62 can be threaded onto the tubular portion 60 to preload the four-point angular contact bearing 50, and the axle housing assembly 12 can further comprise first and second end caps 64 and 66, respectively, that can be fixedly but removably coupled to the opposite axial ends of the carrier housing 30. The first end cap 64 can cooperate with a first axial end of the carrier housing 30 to define a clutch cavity 70 into which portions of the clutch 20 can be received, while the second end cap 66 can cooperate with a second, opposite axial end of the carrier housing 30 to define a differential cavity 72 into which the differential assembly 18 can be received. The first and second end caps 64 and 66 can further define bearing mounts 74a and 74b, respectively, and seal mounts 76a and 76b, respectively. Bearings 78 can be mounted on the bearing mounts 74a and 74b and can be configured to support the first and second output members 22 and 24, respectively, for rotation relative to the axle housing assembly 12. Shaft seals 80 can be mounted on the seal mounts 76a and 76b and can be configured to form seals between the axle housing assembly 12 and the first and second output members 22 and 24, respectively. The first and second end caps 64 and 66 can be sealingly engaged to the carrier housing 30 in any manner that is desired. In the particular example provided, each of the first and second end caps 64 and 66 has a joint face 84 that defines a groove 86 that receives a seal member 86; each of the joint faces 84 is abutted against a mating joint face 90 formed on the carrier housing 30 such that each of the seal members 86 sealingly engages a corresponding one of the joint faces 84 and a corresponding one of the mating joint face 90. Moreover, the carrier housing 30 can define a pump mount 96 that can define an intake conduit 96 and one or more output conduits 98. The intake conduit 96 can be coupled in fluid communication with a sump 100 that is defined by the carrier housing 30. The sump 100 can be configured to hold a lubricant that is used to lubricate and/or cool portions of the axle assembly 10. The output conduit(s) 98 can be employed to transmit fluid to various portions of the axle assembly 10, for example to lubricate and/or cool those portions and/or to operate the clutch 20. The pump mount 96 can be located in any desired location, such as a location that is disposed on the carrier housing 30 across from the input pinion 14.

In the particular example provided, the differential assembly 18 is a planetary-type differential assembly having a ring gear 110, a planet carrier 112, a plurality of planet gears 114 and a sun gear 116. The ring gear 110 can be fixedly coupled to the ring gear 16 for common rotation about the second axis 52. In the particular example provided, the ring gear 110 is welded to the ring gear 16, but it will be appreciated that other connection means, such as a toothed or spline connection, and/or a plurality of fasteners could be used in addition to or in lieu of a weld. The planet carrier 112 can comprise a carrier body and a plurality of pins 124. The carrier body can comprise first and second carrier plates 126 and 128, respectively, that can have a generally annular shape and can be spaced apart along the second axis 52. The second carrier plate 128 can define a plurality of output spline teeth 130. Each of the pins 124 can be fixedly coupled to the first and second carrier plates 126 and 128. Each of the planet gears 114 can be journally supported on an associated one of the pins 124 and can be meshingly engaged with both the ring gear 110 and the sun gear 116. The sun gear 116 can be fixedly coupled to a spindle 136 that can transmit rotary power between the sun gear 116 and the clutch 20. The spindle 136 can be received through the ring gear 16 and a central bore 138 formed in the generally tubular portion 60 on the carrier housing 30. The spindle 136 can be supported for rotation relative to the generally tubular portion 60 by a pair of bearings 140, such as roller or needle bearings, that can be spaced apart from one another along the second axis 52. It will be appreciated that the sun gear 116 and the planet carrier 112 can be considered to be differential outputs of the differential assembly 18.

The clutch 20 can be any type of clutch that is configured to selectively transmit rotary power between the differential assembly 18 and the first output member 22. In the particular example provided, the clutch 20 is a friction clutch that comprises a first clutch portion 150, a second clutch portion 152, a clutch pack 154, and an actuator 156.

The first clutch portion 150 can be coupled to an end of the spindle 136 that is opposite the sun gear 116. The first clutch portion 150 can include a first coupling portion 160, a second coupling portion 162, and a first radially extending portion 164 that extends in a radial direction between the first and second coupling portions 160 and 162. The first coupling portion 160 can comprise a plurality of spline teeth 166 that can be meshingly engaged to a plurality of mating spline teeth 168 that are formed on the spindle 136. The first radially extending portion 164 can be integrally and unitarily formed with the first coupling portion and can define a first annular shoulder 170 against which an annular thrust bearing 172 can be located. The annular thrust bearing 172 can be disposed between the first radially extending portion 164 and an annular surface 176 that is formed on an end face 178 of the carrier housing 30. In the particular example provided, the second coupling portion 162 is a discrete component that is fixedly coupled (e.g., welded) to the first radially extending portion 164. The second coupling portion 162 can include an annular body member 182, which can be located on a second annular shoulder 184 formed on the first radially extending portion 164, and a circumferentially extending flange 186. The circumferentially extending flange 186 can define a plurality of first clutch teeth 188.

The second clutch portion 152 can comprise a third coupling portion 190, a fourth coupling portion 192 and a second radially extending portion 194 that extends in a radial direction between the third and fourth coupling portions 190 and 192. The third coupling portion 190 can include a circumferentially extending flange that can define a plurality of second clutch teeth 200. The fourth coupling portion 192 can comprise a plurality of spline teeth 202. If desired, one or more apertures 206 can be formed through the first radially extending portion 164 and/or the second radially extending portion 194 and/or the circumferentially extending flange of the third coupling portion 190 to facilitate the transmission of a lubricating and/or cooling fluid through the clutch 20.

The clutch pack 154 can comprise a plurality of first clutch plates 220 that are interleaved with a plurality of second clutch plates 222. The first clutch plates 220 can be rotatably coupled to the first clutch portion 150 in any desired manner. Similarly, the second clutch plates 222 can be rotatably coupled to the second clutch portion 152 in any desired manner. In the particular example provided, the first and second clutch plates 220 and 222 have outer and inner spline teeth that matingly engage the first and second clutch teeth 188 and 200, respectively.

The actuator 156 can comprise an apply plate 230, a thrust bearing 232, a cylinder assembly 234, one or more springs 236 for biasing the apply plate 230 in a predetermined return direction, and a fluid pump 238. The apply plate 230 can be an annular structure that can be non-rotatably but axially slidably coupled to the second clutch portion 152 and can include an apply portion 250, an annular shoulder 252 and one or more reaction members 254. In the example provided, the apply portion 250 includes a plurality of apertures that are slidably received on the second clutch teeth 200 such that the apply portion 250 is slidably disposed on the third coupling portion 190. The apply portion 250 is configured to abut the clutch pack 154. The reaction member(s) 254 can extend radially inwardly from the third coupling portion 190 and the one or more springs 236, which can comprise a plurality of helical coil compression springs, can be received between the second radially extending portion 194 and the reaction member(s) 254 to bias the apply plate 230 in an axial direction along the second axis 52 away from the second radially extending portion 194. The annular shoulder 252 can be disposed on a side of the apply plate 230 that is opposite the clutch pack 154. The thrust bearing 232 can be located or received on the annular shoulder 252. The cylinder assembly 234 can comprise a cylinder 260 and a piston 262. The cylinder 260 can be defined by an annular cavity 264 formed in the first end cap 64. The piston 262 can comprise an annular structure 266 and a pair of seals 268a and 268b that are mounted to the outside diametrical surface and the inside diametrical surface of the annular structure 266 to form respective seals between the annular structure 266 and the outer and inner cylinder walls 270 and 272, respectively. The fluid pump 238 can be any type of pump, such as a gerotor pump, and can be mounted to the pump mount 96 on the carrier housing 30. The fluid pump 238 can be configured to intake fluid from the sump 100 via the intake conduit 96 and to output pressurized fluid to the output conduit(s) 98 to provide fluid to desired areas of the axle assembly 10. Optionally, one or more of the output conduits 98 could be configured to provide fluid to selected areas of the axle assembly 10 so that the fluid lubricates and/or cools a desired area. At least one output conduit 98 is configured to supply pressurized fluid to the cylinder assembly 234 (i.e., when the fluid pump 238 is operated) to drive the piston 262 in a predetermined apply direction that can be opposite the predetermined return direction. Those of skill in the art will appreciate that movement of the piston 262 in the predetermined apply direction causes corresponding movement of the apply plate 230 along the second axis 52 toward the second radially extending portion 194 of the second clutch portion 152 to thereby compress the clutch pack 154 so that rotary power can be transmitted through the clutch 20. Those of skill in the art will further appreciate that a biasing force produced by the at least one spring 236 and applied to the apply plate 230 can be configured to drive the apply plate 230 and the piston 262 in the predetermined return direction when pressurized fluid is not supplied by the fluid pump 238 and fluid pressure in a volume between the piston 262 and the cylinder 260 has dropped below a predetermined fluid pressure. The drop in fluid pressure in the volume between the piston 262 and the cylinder 260 can be a result of the opening of a control valve (not shown) to vent fluid from the volume, leakage of fluid from the volume, and/or reversal of the fluid pump 238 to withdraw fluid from the volume via the at least one output conduit 98. The pump mount 96 can be configured to orient a rotational element of a fluid pump 238, such as an inner rotor of a gerotor pump, along a pump axis 300 that is transverse (e.g., orthogonal) to the first and second axes 36 and 52. In the example provided, the fluid pump 238 is driven by an electric motor 302 having an output shaft 304 that is oriented coincidently with the pump axis 300. Configuration in this manner may be desirable in some instances because the fluid pump 238 and the electric motor 302 are shrouded in part by portions of the axle housing assembly 12, including the carrier housing 30.

The first and second output members 22 and 24 can be generally similar in their construction. The first output member 22 can be a shaft-like structure having a plurality of spline teeth 320, a mating bearing mount 322, a seal surface 324 and a second bearing mount 326. The spline teeth 320 can be matingly engaged to the spline teeth 202 of the fourth coupling portion 192 on the second clutch portion 152. Engagement of the spline teeth 320 of the first output member 22 with the spline teeth 202 of the fourth coupling portion 192 can couple the second clutch portion 152 and the first output member 22 to one another for common rotation about the second axis 52. The mating bearing mount 322 can receive the bearing 78 that is disposed between the first output member 22 and the first end cap 64 to support the first output member 22 for rotation relative to the first end cap 64 about the second axis 52. The bearing 78 can be disposed between a shoulder 330, which can separate the mating bearing mount 322 and the seal surface 324, and a first retaining element 332, such as an external snap ring, that can be axially coupled to the first output member 22. The seal surface 324 can be a circumferentially extending surface against which one or more seal elements (e.g., seal lips) of the seal 80 can be sealingly engaged. A second retaining element 336, such as an external snap ring, can be axially coupled to the spline teeth 320 of the first output member 22 to limit movement of the first output member 22 along the second axis 52 in a direction away from the carrier housing 30. A bearing 340 can be disposed between the spindle 136 and the second bearing mount 326 to further and directly support the first output member 22 for rotation relative to the first end cap 64 about the second axis 52. In the example provided, the bearing 340 is a type of roller bearing, such as a needle bearing, but those of ordinary skill in the art will appreciate that the bearing 340 could be configured differently. If desired, the second bearing mount 326 can be reduced in diameter relative to the first bearing mount 322 to aid in reducing the size of various components of the axle assembly 10, including the bearing 340 and the spindle 136. Shoulders 350 and 352 can be formed on the first output member 22 and the spindle 136 to limit relative axial movement of the bearing 340.

The second output member 24 can be a shaft-like structure having a plurality of spline teeth 420, a mating bearing mount 422, a seal surface 424 and a second bearing mount 426. The spline teeth 420 of the second output member 24 can be matingly engaged to the spline teeth 130 of the planet carrier 112 of the differential assembly 18. Engagement of the spline teeth 420 of the second output member 24 with the spline teeth 130 of the planet carrier 112 can couple the planet carrier 112 and the second output member 24 to one another for common rotation about the second axis 52. The mating bearing mount 422 can receive the bearing 78 that is disposed between the second output member 24 and the second end cap 66 to support the second output member 24 for rotation relative to the second end cap 66 about the second axis 52. The bearing 78 can be disposed between a shoulder 430, which can separate the mating bearing mount 422 and the seal surface 424, and a first retaining element 432, such as an external snap ring, that can be axially coupled to the second output member 24. The seal surface 424 can be a circumferentially extending surface against which one or more seal elements (e.g., seal lips) of the seal 80 can be sealingly engaged. A second retaining element 436, such as an external snap ring, can be axially coupled to the spline teeth 420 of the second output member 24 to limit movement of the second output member 24 along the second axis 52 in a direction away from the carrier housing 30. A bearing 440 can be disposed between the spindle 136 and the second bearing mount 426 to further support the first output member 22 for rotation about the second axis 52. In the example provided, the bearing 440 is a type of roller bearing, such as a needle bearing, but those of ordinary skill in the art will appreciate that the bearing 440 could be configured differently. If desired, the second bearing mount 426 can be reduced in diameter relative to the first bearing mount 424 to aid in reducing the size of various components of the axle assembly 10, including the bearing 440 and the spindle 136. Shoulders 450 and 452 can be formed on the second output member 24 and the spindle 136 to limit relative axial movement of the bearing 440.

Figure 3:
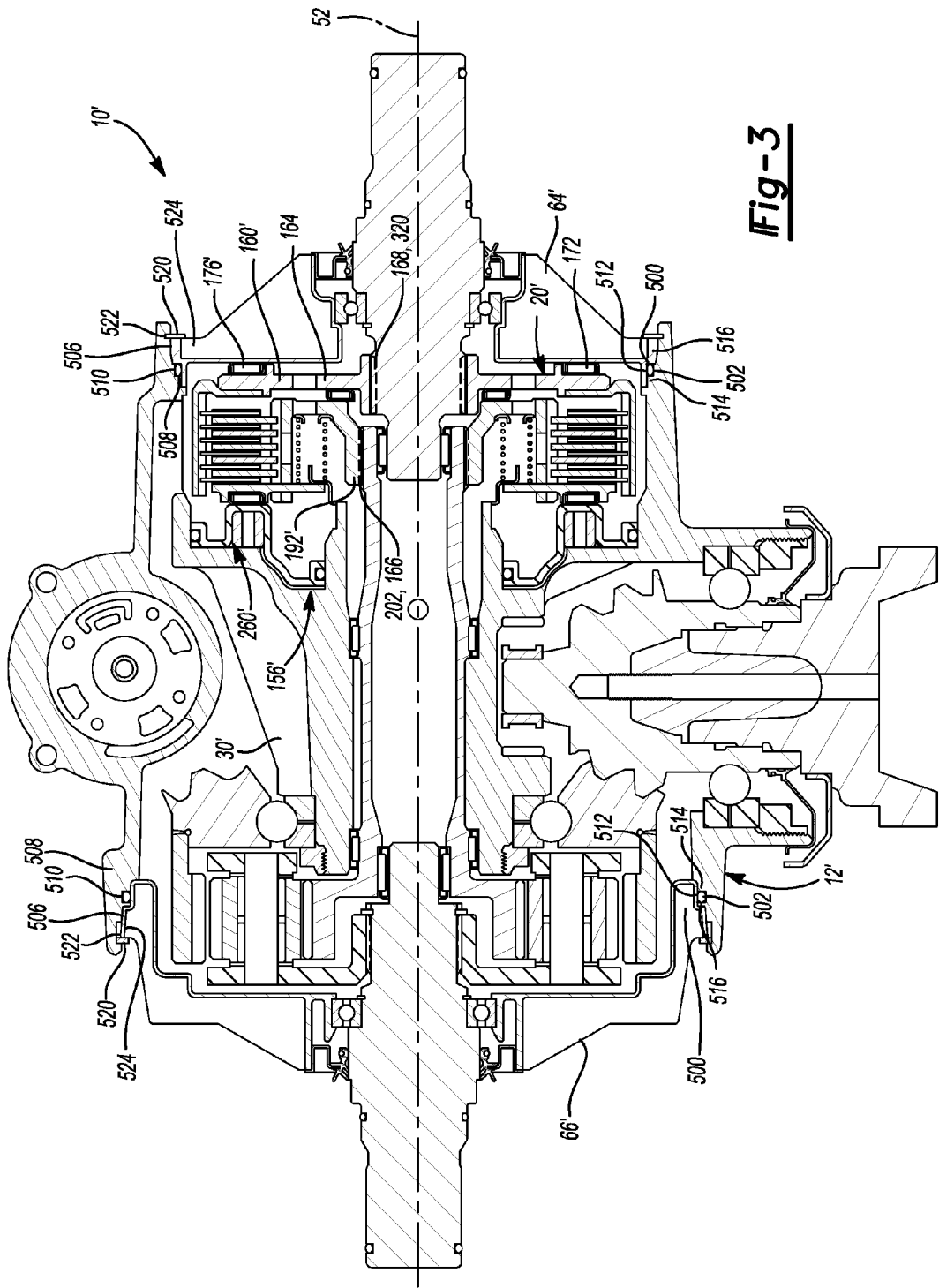
FIG. 3 is a longitudinal section view of a second exemplary disconnecting axle assembly constructed in accordance with the teachings of the present disclosure.

With reference to FIG. 3, a second axle assembly constructed in accordance with the teachings of the present disclosure is generally indicated by reference numeral 10'. The axle assembly 10' is generally similar to the axle assembly 10 of FIG. 1, except that the clutch 20' and its integration into the axle housing assembly 12' have been mirrored along the second axis 52. In this regard, the cylinder 260' associated with the actuator 156' can be defined by the carrier housing 30', the spline teeth 202 of the fourth coupling portion 192' can be meshingly engaged with the spline teeth 168 of the spindle 136, the spline teeth 168 of the first coupling portion 160' can be meshingly engaged with the spline teeth 320 of the first output member 22 and the annular thrust bearing 172 can be disposed between the first radially extending portion 164 and an annular surface 176' that is formed on an end face of the first end cap 64'. Additionally, the configuration of the first and second end caps 64' and 66' can be changed to modify the manner in which the first and second end caps 64' and 66' are sealed and fixedly coupled to the carrier housing 30'. In this regard, each of the first and second end caps 64' and 66' defines a seal shoulder 500 on which an O-ring type seal 502 is mounted. Each seal shoulder 500 is matingly received into an associated bore 506 in an axial end of the carrier housing 30' that defines a corresponding mating seal shoulder 508 so that the O-ring type seal 502 is sealingly engaged to outer and inner circumferentially extending walls 510 and 512, respectively, formed on the carrier housing 30' and one of the first and second end caps 64' and 66' and is disposed axially between shoulder walls 514 and 516 formed on the carrier housing 30' and one of the first and second end caps 64' and 66'. A securing member 520, such as an internal snap ring, can be received into a groove 522 formed in the bore 506 that defines the mating seal shoulder 524 and can be abutted against an outboard lateral side of the first and second end caps 64' and 66'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
    an axle housing assembly having a carrier housing and first and second end caps that are mounted to the carrier housing, the first end cap cooperating with the carrier housing to define a differential cavity, the second end cap cooperating with the carrier housing to define a clutch cavity;
    an input pinion extending into the differential cavity;
    a ring gear in the differential cavity and meshingly engaged with the input pinion, the ring gear being supported for rotation about a first axis by a four-point angular contact bearing;
    a differential assembly received in the differential cavity and configured to receive rotary power from the ring gear, the differential assembly having a first differential output and a second differential output;
    a clutch having a first clutch member and a second clutch member, the clutch being configured to selectively transmit rotary power between the first and second clutch members, the clutch being received in the clutch cavity;
    a spindle drivingly coupling the first differential output with the first clutch member, the spindle being received through a tubular portion of the carrier housing; and
    first and second output members, the first output member being coupled for rotation with the first differential output, the second output member being coupled for rotation with the second clutch member.

2. The axle assembly of claim 1, wherein the clutch is a friction clutch and further comprises a clutch pack having a plurality of first clutch plates, which are coupled to the first clutch member for common rotation, and a plurality of second clutch plates, which are coupled to the second clutch member for common rotation, the first clutch plates being interleaved with the second clutch plates.

3. The axle assembly of claim 2, wherein the clutch further comprises an apply plate, which is abutted against an axial end of the clutch pack, and a cylinder assembly that is configured to selectively translate the apply plate in a first predetermined direction.

4. The axle assembly of claim 3, wherein the clutch further comprises a fluid pump that is mounted to the axle housing assembly and configured to supply a pressurized fluid to the cylinder assembly to translate the apply plate in the first predetermined direction.

5. The axle assembly of claim 4, wherein the fluid pump is reversible to withdraw fluid from the cylinder assembly to translate the apply plate in a second predetermined direction that is opposite the first predetermined direction.

6. The axle assembly of claim 3, wherein the clutch further comprises at least one biasing spring that is configured to urge the apply plate in a predetermined axial direction relative the carrier housing.

7. The axle assembly of claim 3, wherein the cylinder assembly comprises a cylinder having wall members that are defined by the second end cap.

8. The axle assembly of claim 3, wherein the cylinder assembly comprises a cylinder having wall members that are defined by the carrier housing.

9. The axle assembly of claim 1, wherein the four-point angular contact bearing is mounted on the tubular portion of the carrier housing.

10. The axle assembly of claim 9, wherein a nut is threaded onto the tubular portion to preload the four-point angular contact bearing.

11. The axle assembly of claim 1, wherein the differential assembly comprises a planetary transmission.

12. The axle assembly of claim 11, wherein the planetary transmission comprises a planet carrier and a sun gear and wherein one of the planet carrier and the sun gear is rotatably coupled to the spindle.

13. The axle assembly of claim 1, wherein a pair of bearings support the spindle for rotation within the tubular portion of the carrier housing.

14. The axle assembly of claim 13, wherein the pair of bearings comprises roller bearings.

15. The axle assembly of claim 1, wherein each of the first and second output members has an inboard shaft portion that is supported for rotation by a bearing that is disposed between the inboard shaft portion and the spindle.

16. The axle assembly of claim 15, wherein the bearings that are disposed between the inboard shaft portions and the spindle are roller bearings.

17. The axle assembly of claim 15, wherein a first bearing is mounted directly to the first end cap and the first output member to support the first output member for rotation relative to the axle housing assembly, and wherein a second bearing is mounted directly to the second end cap and the second output member to support the second output member for rotation relative to the axle housing assembly.

18. The axle assembly of claim 17, further comprising a pair of shaft seals, each of the shaft seals being mounted to an associated one of the first and second end caps and sealingly engaged to an associated one of the first and second output members.

19. The axle assembly of claim 1, wherein the first end cap is received into a first bore formed in the carrier housing.

20. The axle assembly of claim 19, wherein the second end cap is received into a second bore formed in the carrier housing.

* * * * *